United States Patent
Li et al.

(10) Patent No.: US 8,270,923 B2
(45) Date of Patent: Sep. 18, 2012

(54) TECHNIQUES FOR RECEIVER BEAMFORMING AND YIELDING-THRESHOLD ADJUSTMENTS IN PEER-TO-PEER NETWORKS

(75) Inventors: Junyi Li, Bedminster, NJ (US); Xinzhou Wu, Monmouth Junction, NJ (US); Aleksandar Jovicic, Urbana, IL (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 901 days.

(21) Appl. No.: 12/168,714

(22) Filed: Jul. 7, 2008

(65) Prior Publication Data

US 2009/0015478 A1    Jan. 15, 2009

Related U.S. Application Data

(60) Provisional application No. 60/948,633, filed on Jul. 9, 2007.

(51) Int. Cl.
 *H04B 7/02* (2006.01)
(52) U.S. Cl. ............. 455/276.1; 455/501; 455/67.11
(58) Field of Classification Search .......... 455/269.271, 455/272, 273, 450, 452.1, 452.2, 522, 276.1, 455/67.11, 67.13, 501, 515, 518
See application file for complete search history.

(56) References Cited

U.S. PATENT DOCUMENTS

| | | | |
|---|---|---|---|
| 7,096,051 B1 * | 8/2006 | Alder | 455/701 |
| 7,684,761 B2 * | 3/2010 | Hottinen | 455/69 |
| 2003/0100343 A1 | 5/2003 | Zourntos et al. | |
| 2006/0094468 A1 | 5/2006 | Hoshino et al. | |

FOREIGN PATENT DOCUMENTS

| | | | |
|---|---|---|---|
| EP | 0773636 A1 | | 5/1997 |
| EP | 1339251 A2 | | 8/2003 |
| EP | 1562310 A1 | | 8/2005 |
| EP | 1 562 310 | * | 10/2011 |
| JP | 09219615 | | 8/1997 |
| JP | 2004165834 A | | 6/2004 |
| JP | 2005303910 A | | 10/2005 |
| JP | 2006287661 A | | 10/2006 |

OTHER PUBLICATIONS

International Search Report and Written Opinion—PCT/US08/069439, International Searching Authority—European Patent Office, May 15, 2009.

* cited by examiner

*Primary Examiner* — Blane J Jackson
(74) *Attorney, Agent, or Firm* — Peng Zhu; Paul S. Holdaway

(57) ABSTRACT

To mitigate interference between multiple peer-to-peer devices, transmitter yielding and/or receiver yielding may be performed among devices operating in a peer-to-peer network. Generally, a transmitter device will yield communications on a time slot to a higher priority transmitter device if it will cause unacceptable interference to a higher priority receiver device. Likewise, a receiver device may yield use of the time slot if interference is unacceptably high. Both transmitter and receiver yielding may be improved by use of beamforming at a receiver device. By utilizing beamforming information to make the transmitter and/or receiver yielding decisions, better interference mitigation may be achieved.

26 Claims, 11 Drawing Sheets

TECHNIQUES FOR RECEIVER BEAMFORMING AND YIELDING-THRESHOLD ADJUSTMENTS IN PEER-TO-PEER NETWORKS

CLAIM OF PRIORITY UNDER 35 U.S.C. §119

The present Application for Patent claims priority to U.S. Provisional Application No. 60/948,633 entitled "Techniques for Receiver Beamforming and Yielding-Threshold Adjustments in Peer to Peer Networks" filed Jul. 9, 2007, and assigned to the assignee hereof and hereby expressly incorporated by reference herein.

FIELD

At least one aspect relates to wireless communications within a peer-to peer (P2P) network and, in particular, the methods by which mobile stations (peers) choosing yielding thresholds based on the receiver beamforming capability.

BACKGROUND

In a wireless network, e.g., an ad hoc peer-to-peer network, in which a network infrastructure does not exist, a terminal has to combat certain challenges in order to set up a communication link with another peer terminal. Due to the ad hoc nature of peer-to-peer networks, one challenge is mitigate or prevent interference between different peer-to-peer transmissions. More particularly, because the peer-to-peer connections may share a frequency spectrum, it is possible that two peer-to-peer transmissions may interfere with each other.

Consequently, a way is needed to mitigate interference between peer-to-peer connections.

SUMMARY

Interference mitigation between peer-to-peer connections may be achieved by a protocol in which transmitter and/or receiver yielding is implemented. Such transmitter and/or receiver yielding may be further improved by using a plurality of receive antennas in a receiver device.

For example, a second device equipped with a plurality of receive antennas may be configured to perform receiver yielding. The second device may operate to facilitate a wireless peer-to-peer connection with a first device. A first pilot signal is received by the second device from the first device over a shared frequency spectrum, the first pilot signal being received in each of the plurality of receive antennas. A plurality of receive beamforming coefficients may be determined as a function of the received first pilot signals in each of the plurality of receive antennas, each of the plurality of receive beamforming coefficients corresponding to one receive antenna. The second device then calculates a signal-to-interference ratio of the first pilot signal by combining the first pilot signal received from the plurality of receive antennas using the determined plurality of receive beamforming coefficients. A rate report signal may be sent to the first device, the rate report including control information determined by the signal-to-interference ratio of the first pilot signal.

The second device may subsequently receive a traffic signal from the first device, the traffic signal being received in each of the plurality of receive antennas. The traffic signal received from the plurality of receive antennas is combined using the plurality of receive beamforming coefficients. The combined traffic signal can then be decoded. The plurality of receive beamforming coefficients may be determined to maximize the signal power of the combined first pilot signal when the plurality of receive beamforming coefficients are used to combine the first pilot signal received from the plurality of receive antennas.

The second device may also receive a second pilot signal from a third device, the second pilot signal being received in each of the plurality of receive antennas and representing interference to the second device. The third device intends to send traffic to a fourth device and therefore may cause interference to the second device. The plurality of receive beamforming coefficients may be determined also as a function of the received second pilot signals in each of the plurality of receive antennas.

The plurality of receive beamforming coefficients may be determined to minimize the interference power of the combined second pilot signal when the plurality of receive beamforming coefficients are used to combine the second pilot signal received from the plurality of receive antennas. The plurality of receive beamforming coefficients may be determined to maximize the ratio of the signal power to the interference power, the signal power being the power of the combined first pilot signal and the interference power being the power of the combined second pilot signal when the plurality of receive beamforming coefficients are used to combine respectively the first and second pilot signals received from the plurality of receive antennas.

Prior to receiving the first pilot, the second device may also receive a first transmission request signal from the first device over the shared frequency spectrum, the first transmission request signal indicating that the first device intends to transmit a traffic signal to the second device. The second device then monitors the shared frequency spectrum to receive a second transmission request signal, the second transmission request signal being transmitted by a third device and indicating that the third device intends to transmit a traffic signal to a fourth device. A determination is made as to whether to transmit a request response signal to the first device as a function of the received power of the first and second transmission request signals. The request response signal may indicate that the second device is ready to receive a traffic signal from the first device. The second device then transmits the request response signal to the first device if it is determined to transmit a request response signal. An instance of the first transmission request signal is received in each of the plurality of receive antennas and instance of the second transmission request signal is received in each of the plurality of receive antennas. A plurality of receive beamforming coefficients are determined as a function of the received instances of the first and second transmission request signals in each of the plurality of receive antennas, each of the plurality of receive beamforming coefficients corresponding to one receive antenna. The instances of the first transmission request signal received from the plurality of receive antennas are combined by the second device using the determined plurality of receive beamforming coefficients. Likewise, the instances of the second transmission request signal received from the plurality of receive antennas are combined using the determined plurality of receive beamforming coefficients. The second device may then calculate the ratio of the power of the combined first transmission request signal to the power of the combined second transmission request signal. Determining whether to transmit a request response signal to the first device may be done as a function of the power ratio. The second device may then calculate the ratio of the received power of the first transmission request signal and the received power of the second transmission request signal. The second device determines to transmit a request response signal to the first device if the calculated power ratio is greater than or equal to a receiver yielding threshold. The value of the receiver yielding threshold may depend on the number of the plurality of receive antennas, the value of the receiver yielding threshold decreasing as the number of receive antennas increases. The second device may also send a control message to the third device, the control message including control information indicating that the second device is capable of receive beamforming and the control information also including the number of the plurality of receive antennas equipped at the second device.

In another example, transmitter yielding may be performed by an interfering third device. The third device may have a wireless peer-to-peer connection with a fourth device and shares a frequency spectrum with other peer-to-peer devices. A control message may be received by the third device, where the control message including control information indicating that a second device is capable of receive beamforming. The third device may then transmit a first transmission request signal to the fourth device, the first transmission request signal indicating that the third device intends to transmit a traffic signal to the fourth device. The third device may then monitor the frequency spectrum to receive a first request response signal from the fourth device, the first request response signal indicating that the fourth device is ready to receive a traffic signal from the third device. Similarly, the third device may monitoring to receive a second request response signal from the second device, the second request response signal indicating that the second device is ready to receive a traffic signal from a first device. An interference cost to the second device is then calculated by the third device, the interference cost being a function of the received power of the second request response signal. The third device may then determine whether to transmit a traffic signal to the fourth device by comparing the calculated interference cost with a transmitter yielding threshold. If the interference cost is below the transmitter yielding threshold, the third device transmits a traffic signal to the fourth device. The control information may also include the number of receive antennas equipped at the second device. The value of the transmitter yielding threshold depends on the number of receive antennas of the second device. For instance, the value of the transmitter yielding threshold increases with the number of receive antennas of the second device, meaning that as the number of receive antennas of the second device increases, the second device has greater ability of rejecting interference from the third device and therefore the third device may need to yield to the second device less often—the third device will have more chance to proceed to send traffic.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
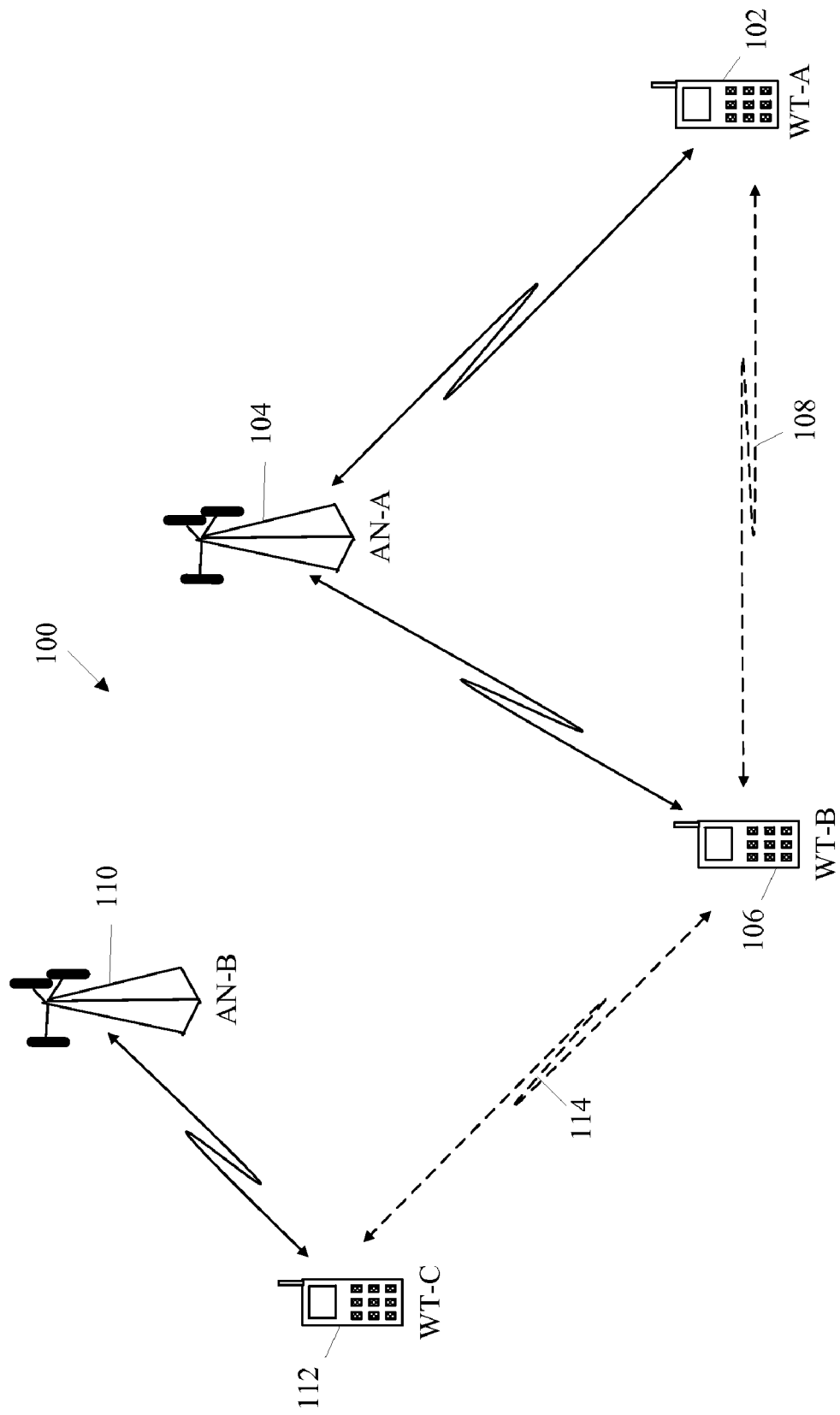
FIG. 1 is a block diagram illustrating the how an ad hoc peer-to-peer network may be implemented, e.g., in conjunction a wide area network.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Overview

One feature provides for establishing an ad hoc peer-to-peer network over an existing channel allocation for another network. To mitigate interference between multiple peer-to-peer devices, devices in the peer-to-peer network may be configured to perform transmitter yielding and/or receiver yielding. Generally, a transmitter device will yield communications on a time slot to a higher priority transmitter device if it will cause unacceptable interference to a higher priority receiver device. Likewise, a receiver device may yield use of the time slot if interference is unacceptably high. Both transmitter and receiver yielding may be improved by use of beamforming at a receiver device. By utilizing beamforming information to make the transmitter and/or receiver yielding decision, better interference mitigation may be achieved.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers (terminals), desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., orthogonal frequency-division multiplexing (OFDM) symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
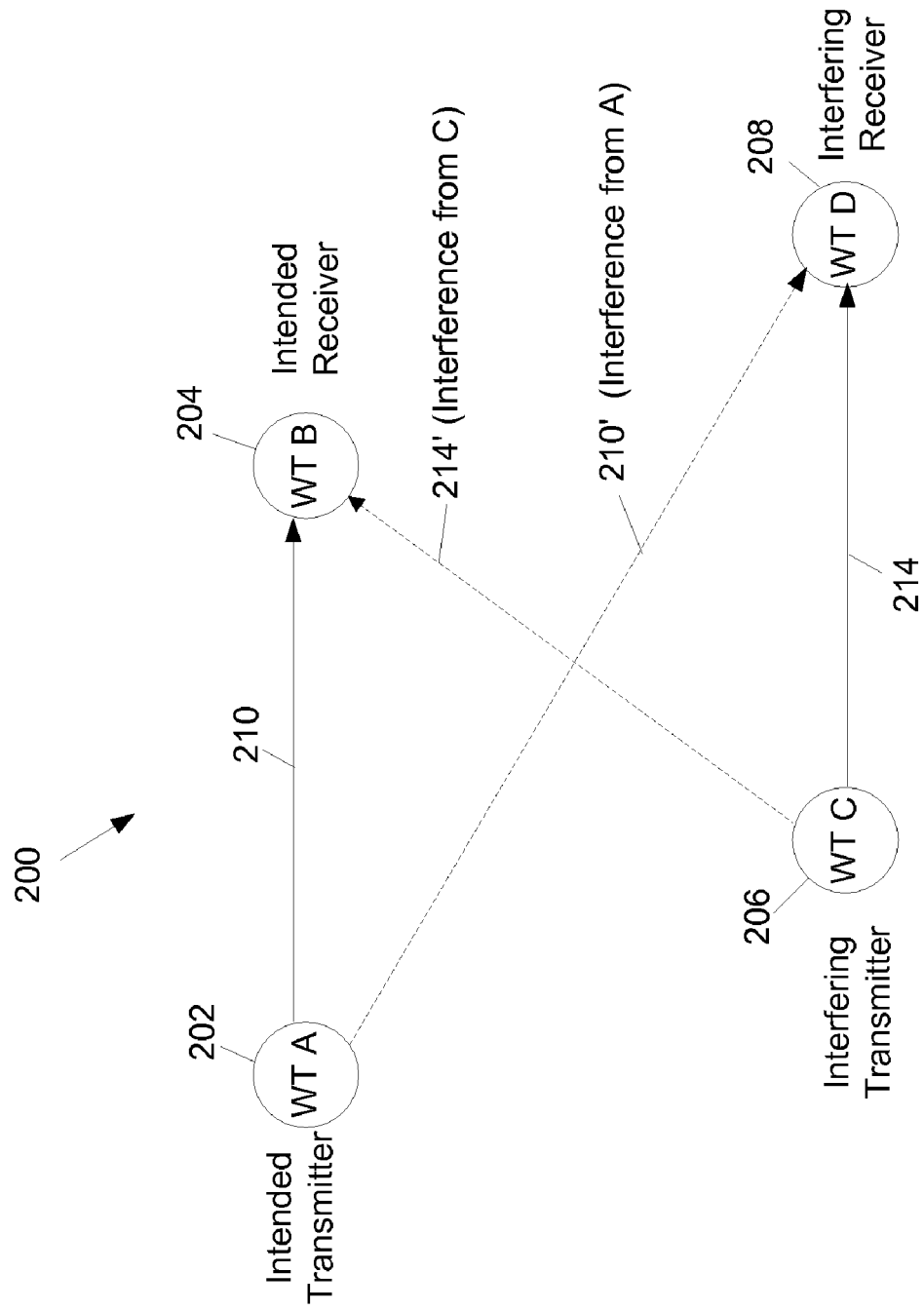
FIG. 2 is a block diagram illustrating an environment in which a plurality of wireless terminals may establish peer-to-peer communication connections that may cause interference to other nearby wireless terminals.

FIG. 2 is a block diagram illustrating an environment in which a plurality of wireless terminals may establish peer-to-peer communication connections that may cause interference to other nearby wireless terminals. A peer-to-peer network 200 may include a plurality of wireless terminals that may share and/or concurrently use a frequency spectrum. The shared frequency spectrum may include one or more transmission and/or control channels, with each transmission (traffic) channel having a corresponding traffic control channel. In one example, the traffic control channel may be used to send a traffic request for communications over a corresponding transmission (traffic) channel.

In one example, a first wireless terminal WT A 202 may be attempting to transmit 310 to a second wireless terminal WT B 204 while a third wireless terminal WT C 206 is concurrently attempting to transmit 214 to a fourth wireless terminal WT D 208 using the same traffic channel bandwidth resource. The first wireless terminal WT A 202 may be referred to as the intended transmitter, the second wireless terminal WT B 204 may be referred to as the intended receiver, and the third wireless terminal WT C 206 may be considered the interferer. In this peer-to-peer network 200, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 214' and 210' among the wireless terminals. For instance, if both transmissions 210 and 214 actually take place, then the signal 214' from the third wireless terminal WT C 206 may be seen as interference to the second wireless terminal WT B 204 receiver and may degrade its ability to successfully recover the desired signal 210 from the first wireless terminal WT A 202. Therefore, certain interference management protocol is needed to manage interference from the third wireless terminal WT C 206 to the second wireless terminal WT B 204. One goal of the interference management protocol is to allow the third wireless terminal WT C 206 to transmit without creating excessive interference to the second wireless terminal WT B 204, thereby increasing the overall throughput and improving the system performance. Note that in the meantime, the first wireless terminal WT A 202 may also cause interference 210' to the fourth wireless terminal WT D 208, and a similar interference management protocol may also be used to control that interference.

Because there is no centralized traffic management authority, there is a chance that WT A 202 and WT C 206 may transmit on the same or overlapping channel, thereby causing interference with each other. For example, by coincidence, both WT A 202 and WT C 206 may use the same transmission CID. A transmission CID may be used to indicate a particular transmission channel (e.g., frequency or time slot) to a receiving terminal WT B 204 and 208. Consequently, when the same transmission CID is used by two terminals, they may also be concurrently transmitting on the same channel or overlapping channels. If both transmitting terminals WT A 202 and WT C 206 are within range of the receiver terminals WT B 204 and/or WT D 208, then the receiver terminals WT B 204 and/or WT D 208 may perceive interference.

In particular, a way is needed that allows multiple wireless terminals to choose channels within the shared frequency spectrum without distinguish between transmissions from an intended peer and those from an unintended peer.

According to one implementation, transmitter and/or receiver yielding may be implemented by devices in a peer-to-peer network that allows a device to backoff if it is likely to experience interference from other nearby devices of higher priority or cause interference to them. Consequently, if the first connection 210 between the first device WT A 202 and second device WT B 204 has a higher priority than the second connection 214 between the third device WT C 206 and the fourth device WT D 208, the third device WT C 206 may implement transmitter yielding and/or the fourth device WT D 208 may implement receiver yielding. When yielding, a device may determine whether its transmission power will unacceptably interfere with transmissions of other nearby devices. Such yielding may also take into account the relative priority of the different transmissions or peer-to-peer connections associated with such transmissions. For instance, a device may decide to yield only if it has a lower connection or transmission priority than another connection or transmission.

In a peer-to-peer network, a connection scheduling stage and a rate scheduling stage may be employed to transmit traffic. In the connection scheduling stage, transmitter-receiver pairs in the network attempt to decide which peer pairs will transmit in a particular time slot. This can be done by letting the transmitter devices send out transmit requests with a fixed power and the receiver devices echo back the requests with a power inversely proportional to the channel gain between them. A transmitter device decides to yield its traffic transmissions on a particular time slot if it sees an echo from one of the other receiver devices (not its peer) with a higher priority and strong enough signal strength. A priority can be quality of service (QoS)-based or purely random tokens generated randomly at each time slot. More precisely, a lower priority transmitter device yields to a higher priority transmitter device if $$\frac{h_{11}}{h_{21}} < SINR_{Tx}.,$$

where $h_{11}$ represents the channel gain between the transmitter-receiver pair and $h_{21}$ represents interference from the interfering transmitter device. In other words, the lower priority transmitter device WT C 206 makes sure its interference 214' to the higher-priority receiver device WT B204 relative to the higher-priority transmission signal strength is bounded. This part is usually referred as the transmitter-yielding part. In one example of transmitter yielding, a transmitting device may determine whether its own transmissions will cause unacceptable interference to another device utilizing a shared channel, and if so, it may not send data transmissions on that shared channel.

On the other hand, each receiver will also measure its own signal strength and the interference from the higher-priority transmitters and decide to yield if $$\frac{h_{11}}{\sum h_{i1}} < SINR_{Rx}.$$

In one example of receiver yielding, a receiver device WT D 208 may not send an echo or reply transmission (e.g., in response to a transmission request) if its noise-to-signal ratio is too low, thereby preventing a corresponding interfering transmitting device WT C 206 from sending traffic to the receiver device WT D 208 on the selected channel. In another example, the receiver device may indicate that a lower transmit power should be used by its corresponding transmitter device to avoid interference.

Beamforming for Receiver Yielding and Rate Scheduling

Figure 3:
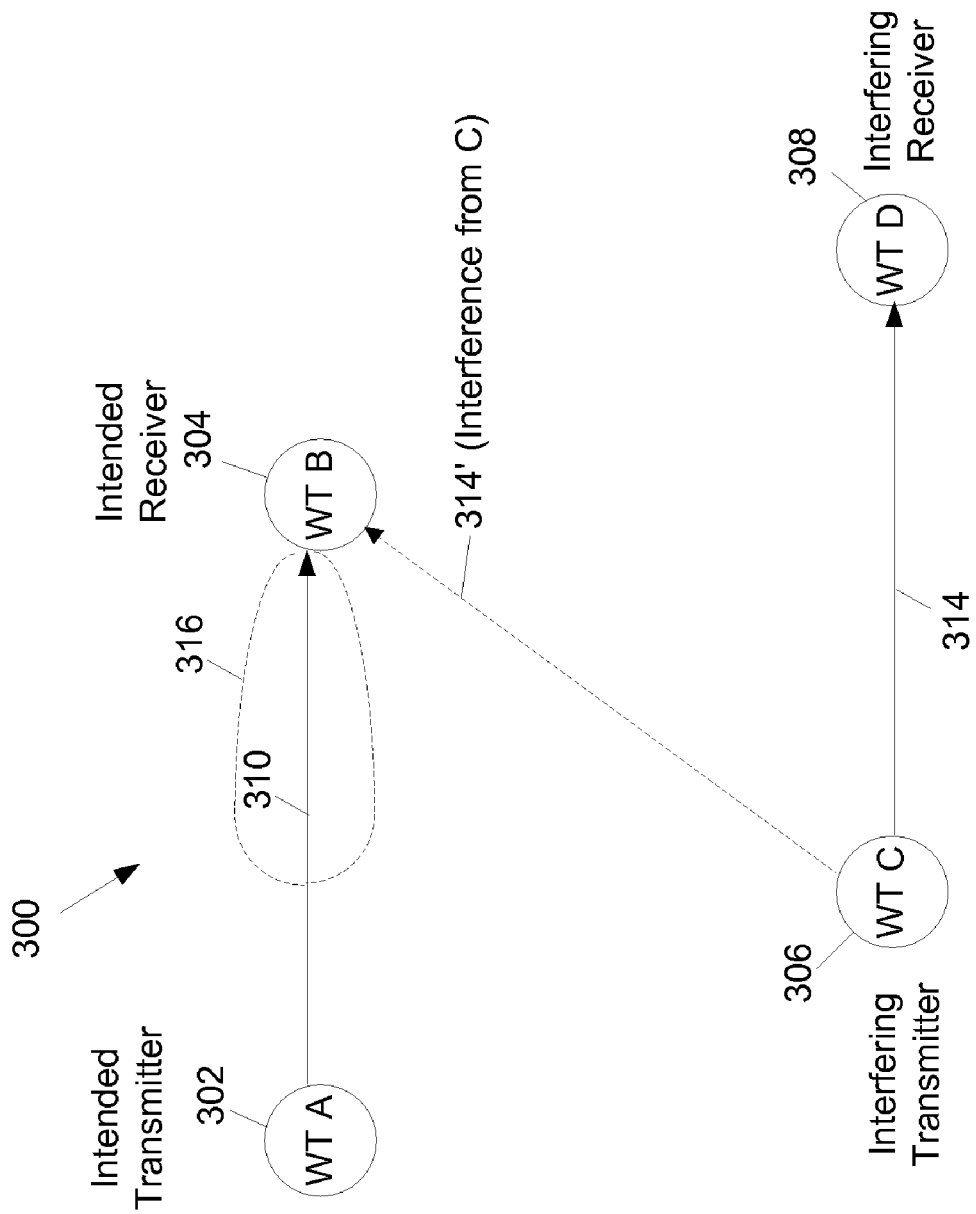
FIG. 3 illustrates one example of how multiple receive antennas may be used by a wireless device to mitigate interference from other peer-to-peer transmission.

FIG. 3 illustrates one example of how multiple receive antennas may be used by a wireless device to mitigate interference from other peer-to-peer transmission. In this example, a first device WT A 302 intends to communicate with a second device WT B 304 over a peer-to-peer connection 310. However, transmissions 314 from a third device WT C 306 to a fourth device WT D 308 may be seen as interference by the second device WT B 304.

Where the second device WT B 304 is equipped with multiple receive antennas, a more intelligent receiver yielding and/or rate scheduling may be performed. That is, the multiple receive antennas allow the second device WT B 304 to focus its reception 316 in the direction of its intended signal from the first device WT A 302. This allows the second device WT B 304 to tolerate greater interference than it otherwise would.

According to one feature, the receiver second device WT B 304 may select a yielding signal-to-interference-plus-noise ratio (SINR) threshold based on its beamforming capability. For instance, the more receive antennas the second device WT B 304 has, the greater interference it is able to take from the interfering third device WT C 306.

In the rate scheduling stage, the scheduled transmitter devices send out pilots to measure the channel and the receiver devices send a feedback indicating a rate option to use.

To enable receiver beamforming for receivers with multiple antennas, a scheduled receiver device may attempt to estimate the transmission rates with the receiver beamforming. There are multiple choices for receiver beamforming depending on the implementation complexity that a wireless device can support. In one example, the second device WT B 304 may implement a matched-filter type of beamforming to maximize the signal strength from its transmitter device WT A 302. In another example, an interference nulling (zero-forcing) scheme may be implemented by the second device WT B 304 to minimize the interference seen by the second device WT B 304. In yet another example, linear minimum mean square error (MMSE) can be used by the second device WT B 304 to maximize the SINR of the received signal at the cost of calculating a matrix inversion. However, such receiver-only approaches fail to obtain good channel estimation in the rate scheduling stage, not only for the channel between the transmitter first device WT A 302 and the receiver second device WT B 304, but also an interference spatial correlation matrix. There are multiple ways to achieve good channel estimation depending on the signaling method of the pilots.

However, we can add more intelligence to the receiver to further improve the system capacity under receiver beamforming. The reason is that for receivers with receiver beamforming capability, it can tolerate stronger interferer in statistics, as compared to single-antenna receiver. Thus, dependent on the number of antennas and receiver algorithms a wireless terminal can support, a wireless terminal can choose different thresholds $SINR_{Tx}$ and $SINR_{Rx}$ for yielding decisions. Generally speaking, the more antennas a receiver device has, it should choose lower yielding thresholds. Between different beamforming strategies, receivers capable of MMSE beamforming should use lower thresholds as compared to simple matched-filter beamforming or zero-forcing beamforming. It can be easily seen that such a scheme can be used in a heterogeneous P2P network where wireless terminals with different number of receiver antennas coexist.

Figure 4:
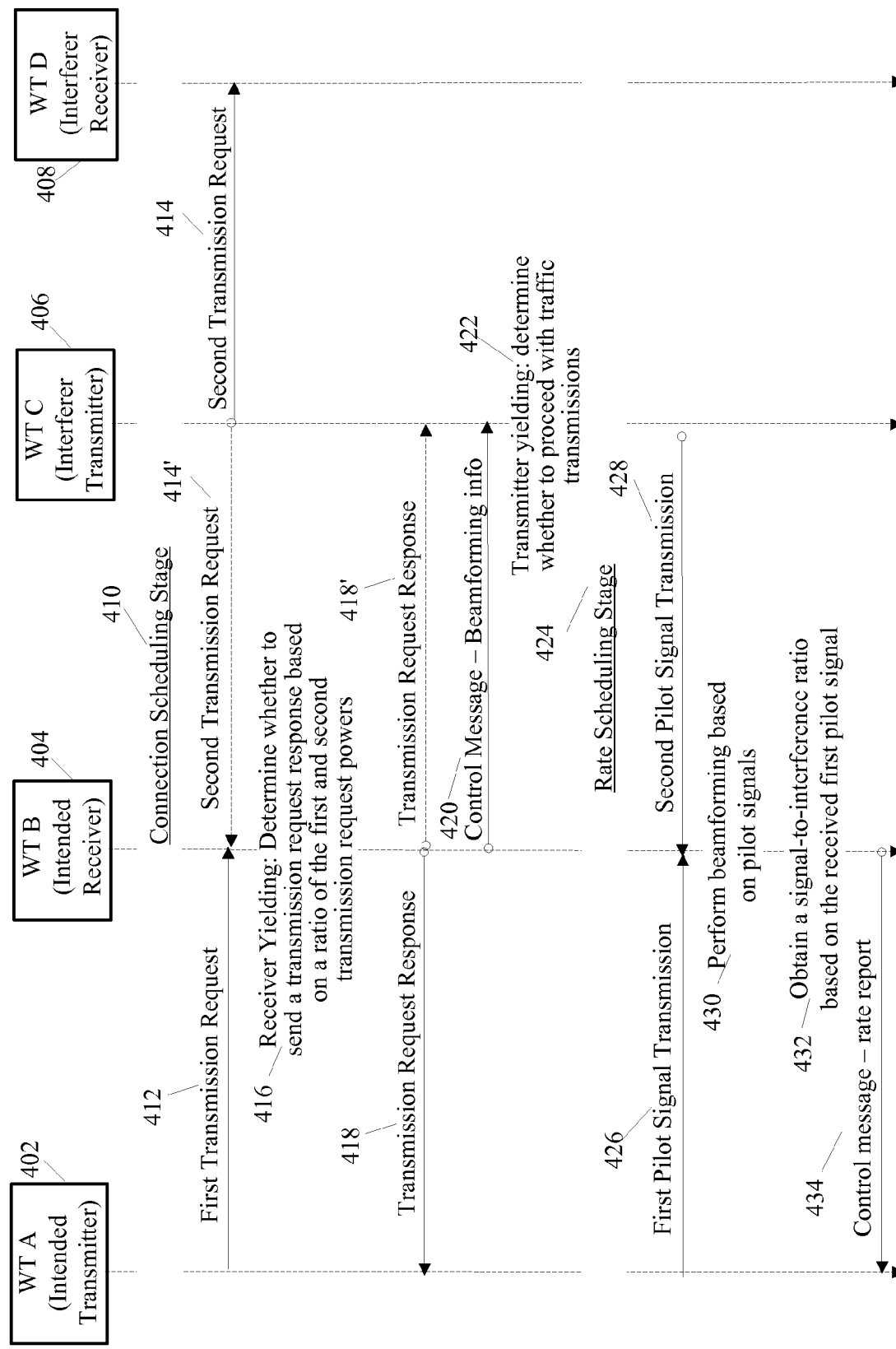
FIG. 4 is a flow diagram illustrating the general operation of devices in a peer-to-peer network to mitigate interference over a shared frequency spectrum.

FIG. 4 is a flow diagram illustrating the general operation of devices in a peer-to-peer network to mitigate interference over a shared frequency spectrum. In this example, a transmitter first device WT A 402 may be attempting to communicate with a receiver second device WT B 404 over a peer-to-peer connection while, concurrently, a transmitter third device WT C 406 maybe attempting to communicate with a receiver fourth device 408 over the shared frequency spectrum. In example, it is assumed (or otherwise determined) that transmissions from the third device WT C 406 have lower priority than transmissions from the first device WT A 402. The second device WT B 404 has multiple receive antennas.

During a connection scheduling stage 410 transmitter devices may indicate their intentions to transmit traffic to receiver devices over a peer-to-peer connection. For instance, the first device WT A 402 may send a first transmission request 412 to the second device WT B 404. Likewise, the third device WT C 406 may send (broadcast) a second transmission request 414 to the fourth device WT D 408. Because of the nature of broadcast signals, the second device WT B 404 may receive both the first and second transmission requests 412 and 414'. The second device WT B 404 may then determine whether to send a transmission request response to the first device WT A 402 based on a ratio of the first and second transmission request powers 416. If the power ratio is greater than or equal to a receiver yielding threshold, the second device WT B 404 transmits the transmission request response 412. The second device WT B 404 may also send a control message 420 to the third device WT C 406 indicating that the second device is capable of receive beamforming and possibly indicating the number of antennas equipped at the second device. Note that the control message 420 may be sent before the connection scheduling stage. For example, the second device may periodically broadcast the control message 420 so that the third device knows the receive beamforming capability of the second device. The third device WT C 406 may then use this information to make a transmitter yielding decision and determine whether to proceed with traffic transmissions 422 to the fourth device WT D 408.

In a rate scheduling stage 424, the second device WT B 404 may receive a first pilot signal 426 from the first device WT A 402 and a second pilot signal 428 from the third device WT C 406. The second device WT B 404 may then perform beamforming 430 using one or more receive antennas to improve reception of the first pilot signal. A signal-to-interference ratio may be obtained based on the first pilot signal 432 which can be used to obtain a traffic transmission rate for the first device WT A 402. The second device WT B 404 then sends a transmission rate report to the first device 434 indicating the traffic transmission rate. The first device WT A 402 can then transmit traffic to the second device WT B 404 using a traffic rate that is equal to or lower than the transmission rate report.

Figure 5A:
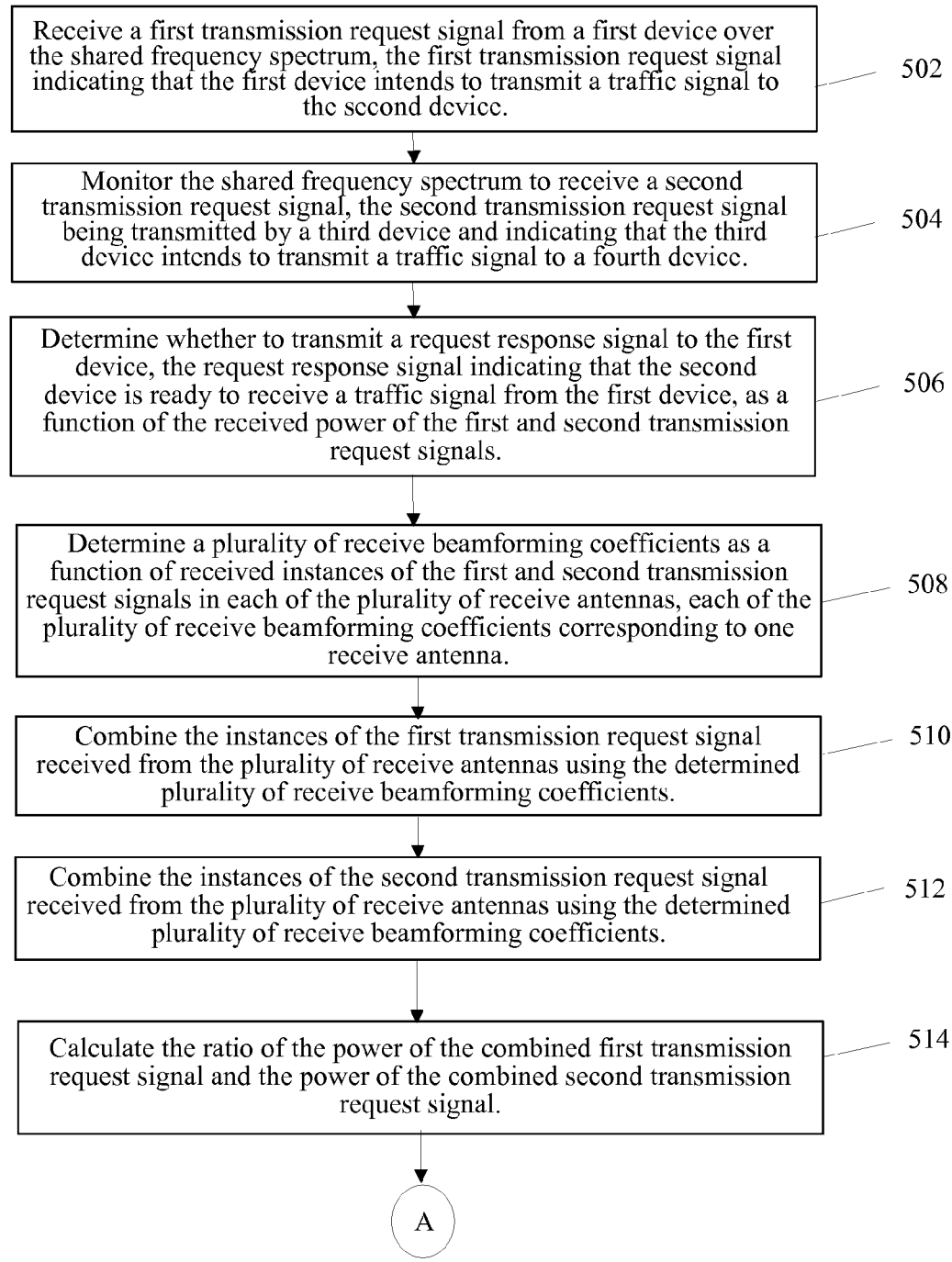
FIG. 5 (comprising FIGS. 5A and 5B) is a flow diagram illustrating a method operational in a multiple receive antenna second device for performing receiver yielding in a peer-to-peer network.
Figure 5B:
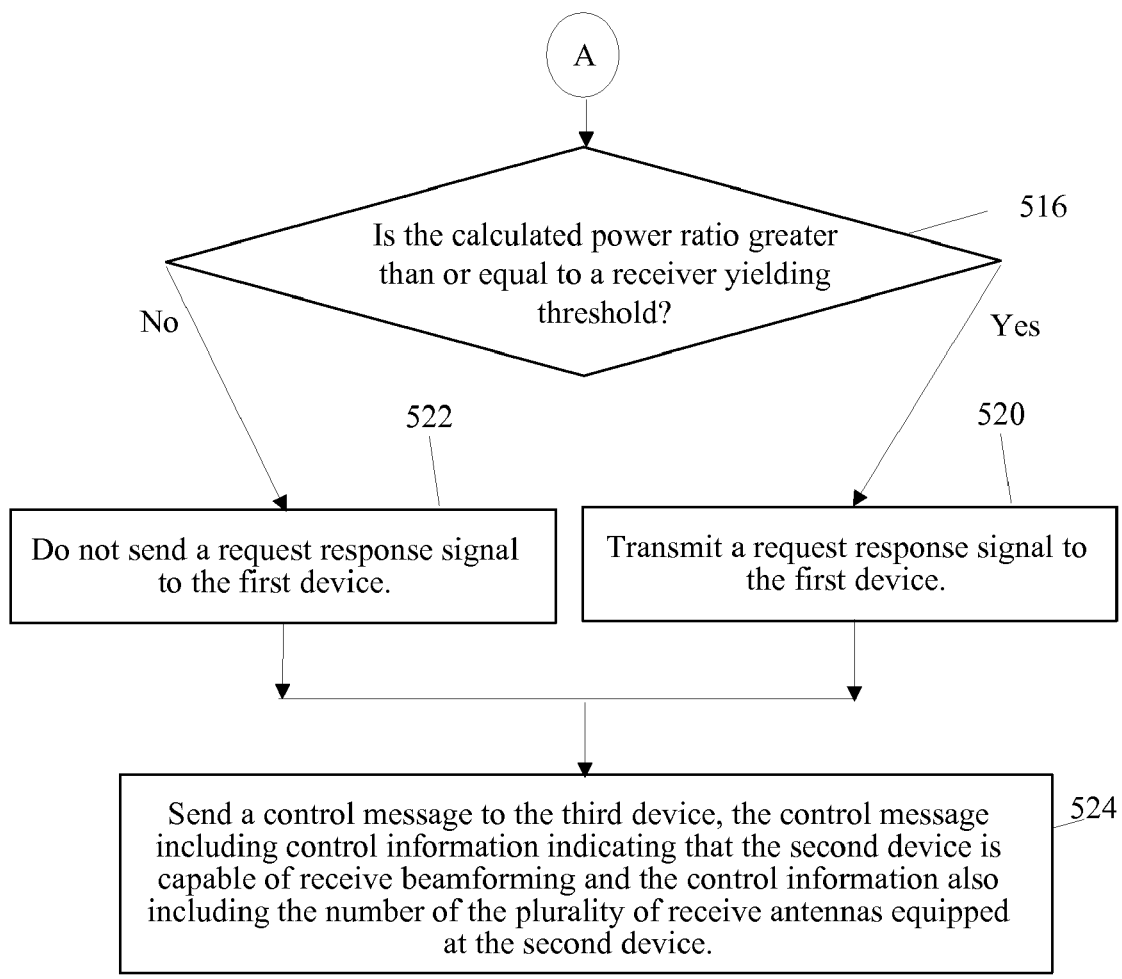

FIG. 5 (comprising FIGS. 5A and 5B) is a flow diagram illustrating a method operational in a multiple receive antenna second device for performing receiver yielding in a peer-to-peer network. In this example, a transmitter first device may be attempting to send traffic to the second device over a peer-to-peer connection. A first transmission request signal is received from the first device over the shared frequency spectrum, the first transmission request signal indicating that the first device intends to transmit a traffic signal to the second device 502. The second device may monitor the shared frequency spectrum to receive a second transmission request signal, the second transmission request signal being transmitted by a third device and indicating that the third device intends to transmit a traffic signal to a fourth device 504. The second device may then determine whether to transmit a request response signal to the first device, the request response signal indicating that the second device is ready to receive a traffic signal from the first device, as a function of the received power of the first and second transmission request signals 506.

One example of how the second device decides whether to transmit the request response signal is herein provided. A plurality of instances of the first transmission request signal and the second transmission request signal may be received in each of the plurality of receive antennas of the second device. Consequently, the second device may determine a plurality of receive beamforming coefficients as a function of the received instances of the first and second transmission request signals in each of the plurality of receive antennas, each of the plurality of receive beamforming coefficients corresponding to one receive antenna 508. The instances of the first transmission request received from the plurality of receive antennas is then combined using the determined plurality of receive beamforming coefficients 510. The second transmission request signals received from the plurality of receive antennas is also combined using the determined plurality of receive beamforming coefficients 512. The second device then calculates a ratio of the power of the combined first transmission request signal to the power of the combined second transmission request signal 514. The decision of whether to transmit a request response signal to the first device may be determined as a function of the power ratio. If the calculated power ratio is greater than or equal to a receiver yielding threshold 516, the second device transmits a request response signal to the first device 520. Otherwise, no request response signal is sent to the first device 522. Note that the value of the receiver yielding threshold depends on the number of the plurality of receive antennas. The value of the receiver yielding threshold decreases as the number of receive antennas in the second device increases.

The second device may also send a control message to the third device, the control message including control information indicating that the second device is capable of receive beamforming and the control information also including the number of the plurality of receive antennas equipped at the second device 524. Although the control message is shown to be sent subsequent to steps 520 or 522, in fact the step of sending the control message 524 can take place anywhere in the protocol, e.g., before step 502 or after step 506.

Figure 6:
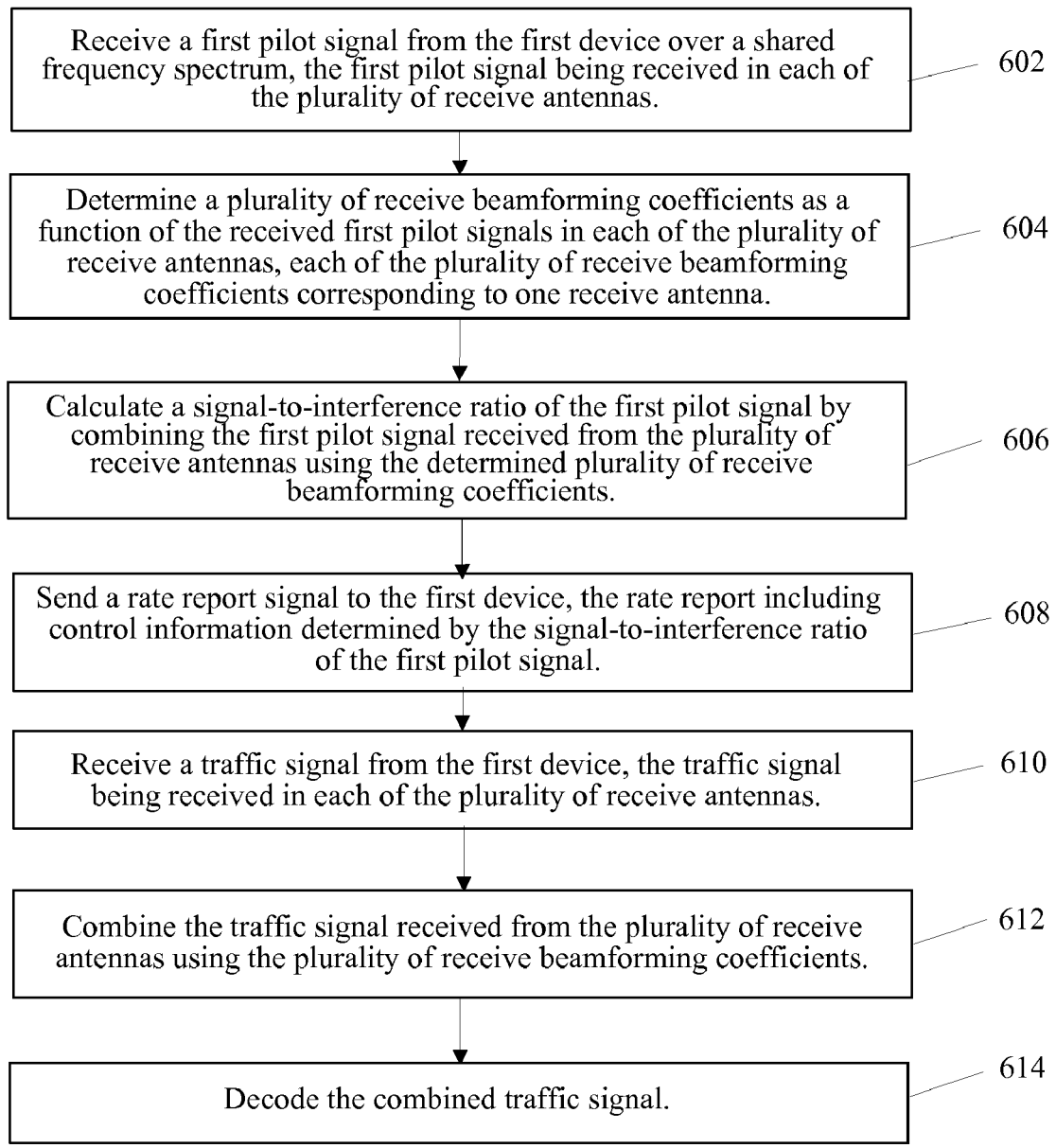
FIG. 6 is a flow diagram illustrating a method operational in a multiple receive antenna second device for performing rate feedback in a peer-to-peer network.

FIG. 6 is a flow diagram illustrating a method operational in a multiple receive antenna second device for performing rate feedback in a peer-to-peer network. In this example, a transmitter first device may have requested to send traffic to the second device over a peer-to-peer connection. A first pilot signal is received by the second device from the first device over a shared frequency spectrum, the first pilot signal being received in each of the plurality of receive antennas 602. The second device then determines a plurality of receive beamforming coefficients as a function of the received first pilot signal in each of the plurality of receive antennas, each of the plurality of receive beamforming coefficients corresponding to one receive antenna 604. For example, a plurality of instances of the first pilot signal may be received, one for each receive antenna.

A signal-to-interference ratio of the first pilot signal may be calculated by the second device by combining the first pilot signal received from the plurality of receive antennas using the determined plurality of receive beamforming coefficients 606. A rate report signal may then be sent to the first device, the rate report including control information determined by the signal-to-interference ratio of the first pilot signal 608.

A traffic signal may be received from the first device, the traffic signal being received in each of the plurality of receive antennas 610. The second device may combine the traffic signal received from the plurality of receive antennas using the plurality of receive beamforming coefficients 612. That is, for each instance of the traffic signal received via the plurality of receive antennas is combined according to the beamforming coefficients for each of the receive antennas. Such beamforming coefficients may serve to maximize the intended signal from the first device while minimizing other interfering signals. The second device can then decode the combined traffic signal 614. In one example, the plurality of receive beamforming coefficients may be selected or determined to maximize the signal power of the combined first pilot signal when the plurality of receive beamforming coefficients are used to combine the first pilot signal received from the plurality of receive antennas.

The second device may receive a second pilot signal from a third device, the second pilot signal being received in each of the plurality of receive antennas and representing interference to the second device. The third device intends to send a traffic signal to a fourth device. Thus, the second pilot represents the interference to the second device that the third device would cause when the third device sends the traffic signal. The plurality of receive beamforming coefficients are then determined also as a function of the received second pilot signals in each of the plurality of receive antennas. The plurality of receive beamforming coefficients are then determined to minimize the interference power of the combined second pilot signal when the plurality of receive beamforming coefficients are used to combine the second pilot signal received from the plurality of receive antennas. The plurality of receive beamforming coefficients may be determined to maximize the ratio of the signal power to the interference power, e.g., using an MMSE design criterion. The signal power being the power of the combined first pilot signal, and the interference power being the power of the combined second pilot signal when the plurality of receive beamforming coefficients are used to combine, respectively, the first and second pilot signals received from the plurality of receive antennas.

Figure 7:
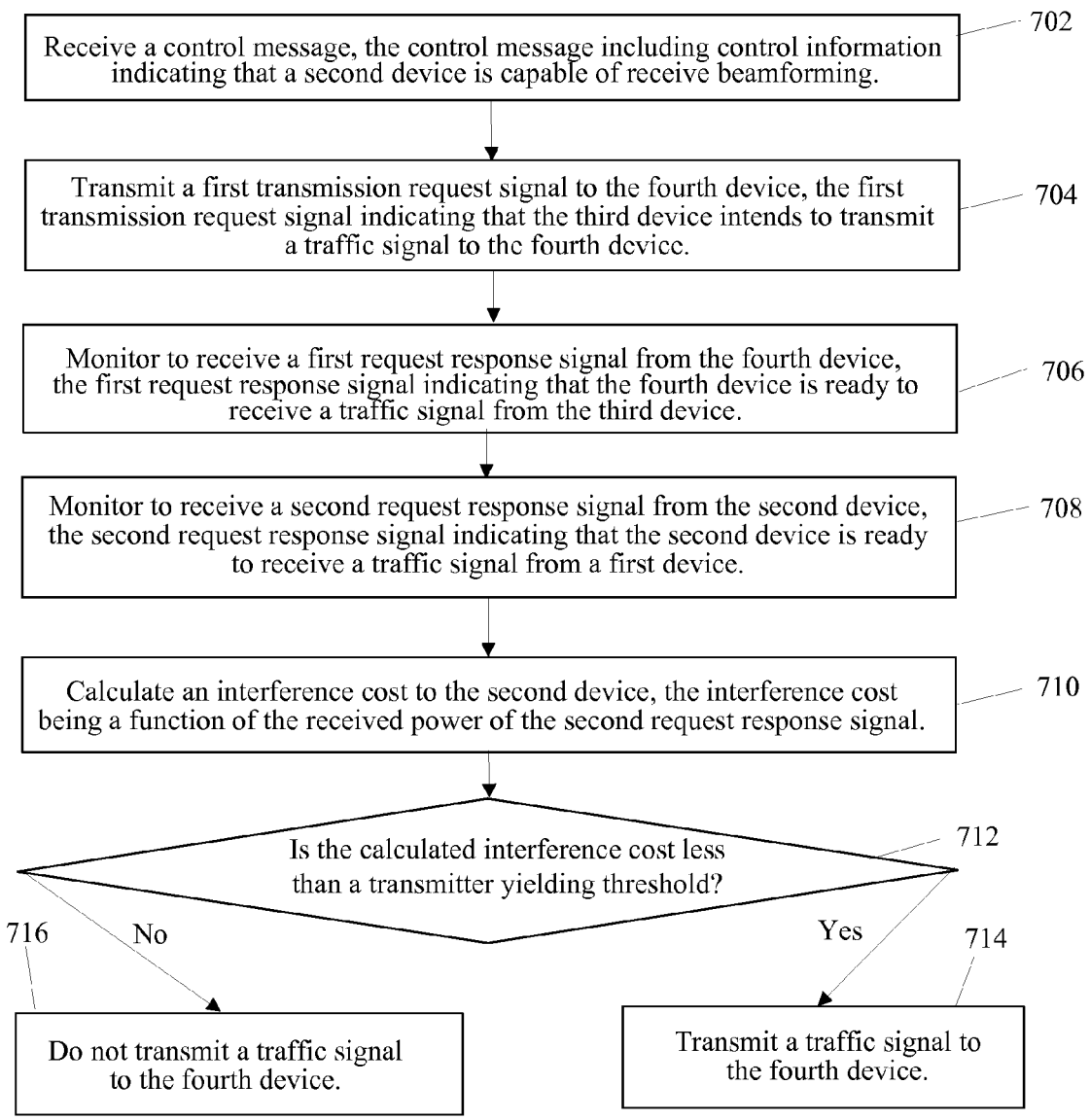
FIG. 7 is a flow diagram illustrating a method of operational in a third device in a peer-to-peer communication network, the third device having a wireless peer-to-peer connection with a fourth device.

FIG. 7 is a flow diagram illustrating a method of operational in a third device in a peer-to-peer communication network, the third device having a wireless peer-to-peer connection with a fourth device. In this example, a peer-to-peer connection between the third device and a receiver fourth device has a lower priority than peer-to-peer connection between a transmitter first device and a receiver second device. Additionally, all four devices operate on a shared frequency spectrum. Consequently, a concurrent transmission from the third device may be considered as interfering with transmissions from the first device. The third device may receive a control message, the control message including control information indicating that a second device is capable of receive beamforming 702. A first transmission request signal is transmitted by the third device to the fourth device, the first transmission request signal indicating that the third device intends to transmit a traffic signal to the fourth device 704. The third device may then monitor the shared frequency spectrum to receive a first request response signal from the fourth device, the first request response signal indicating that the fourth device is ready to receive a traffic signal from the third device 706. Similarly, the third device may also monitor the shared frequency spectrum to receive a second request response signal from the second device, the second request response signal indicating that the second device is ready to receive a traffic signal from the first device 708. An interference cost to the second device may be calculated by the third device, the interference cost being a function of the received power of the second request response signal 710. The third device may then decide whether perform transmitter yielding. In particular, the third device may determine whether to transmit a traffic signal to the fourth device by comparing the calculated interference cost with a transmitter yielding threshold. If the calculated interference cost is less than a transmitter yielding threshold 712, the third device transmits a traffic signal to the fourth device 714. Otherwise, the third device does not transmit traffic to the fourth device 716 (at least not during the current time slot).

The control information received by the third device from the second device may also include the number of receive antennas equipped at the second device. The value of the transmitter yielding threshold depends on the number of receive antennas of the second device, the value of the transmitter yielding threshold increasing as the number of receive antennas of second device increases.

Figure 8:
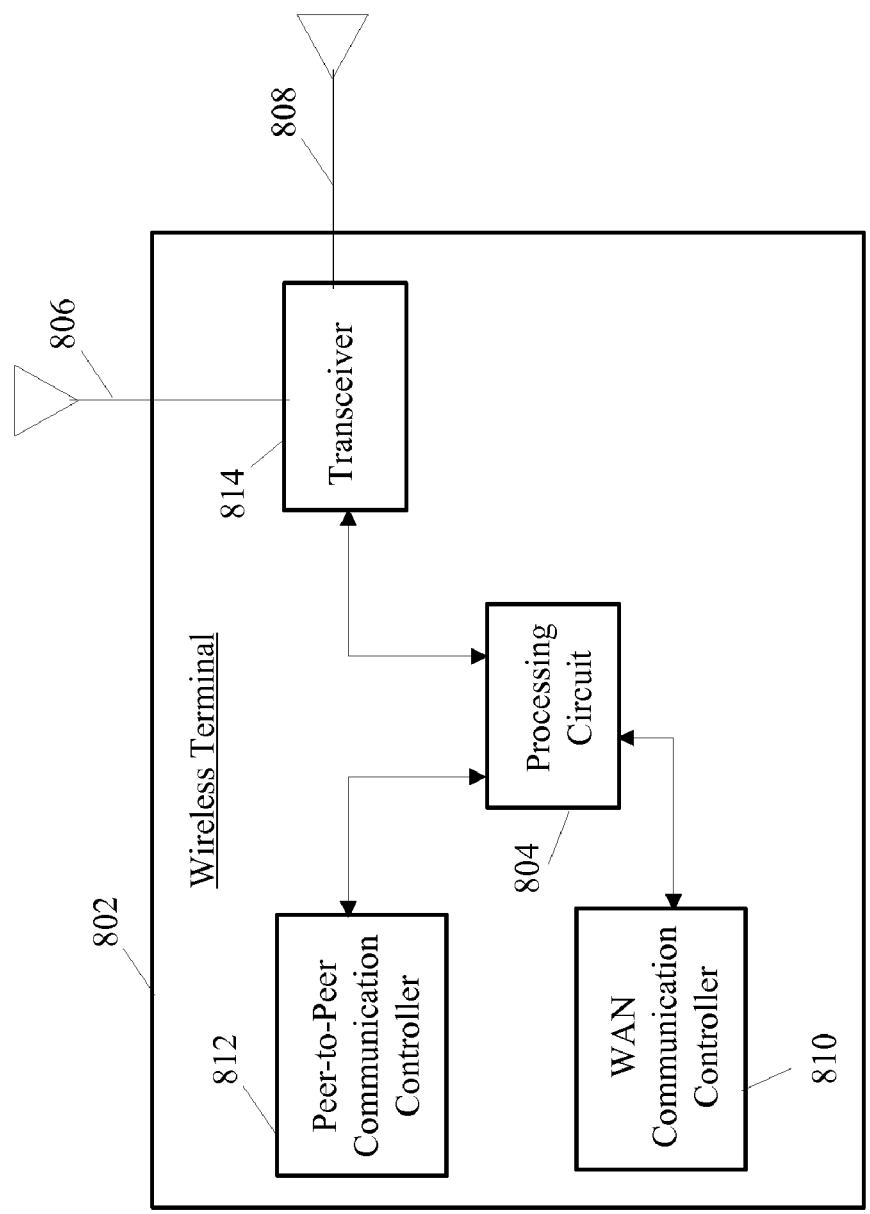
FIG. 8 is a block diagram of a first wireless terminal that may be configured to facilitate peer-to-peer communications with a second wireless terminal over a shared frequency spectrum.

FIG. 8 is a block diagram of a first wireless terminal that may be configured to facilitate peer-to-peer communications with a second wireless terminal over a shared frequency spectrum. The wireless terminal 802 may include a processing circuit (e.g., one or more circuits or processors), a peer-to-peer communication controller 812, a wide area network (WAN) controller 810 and a transceiver 814 coupled to a plurality of antennas 806 and 808. The transceiver 814 may include a (wireless) transmitter and a (wireless) receiver. In one example, the plurality of antennas may be receive antennas and/or transmit antennas. The wireless terminal 802 may communicate via a managed network infrastructure using the WAN communication controller 810 and/or it may communicate over a peer-to-peer network using the peer-to-peer communication controller 812. When performing peer-to-peer communications, the first wireless terminal 802 may be configured to perform one or more of the features illustrated in FIGS. 1-7, including transmitter yielding based on beamforming information for another wireless device, and receiver yielding based on multiple receive antennas.

Figure 9:
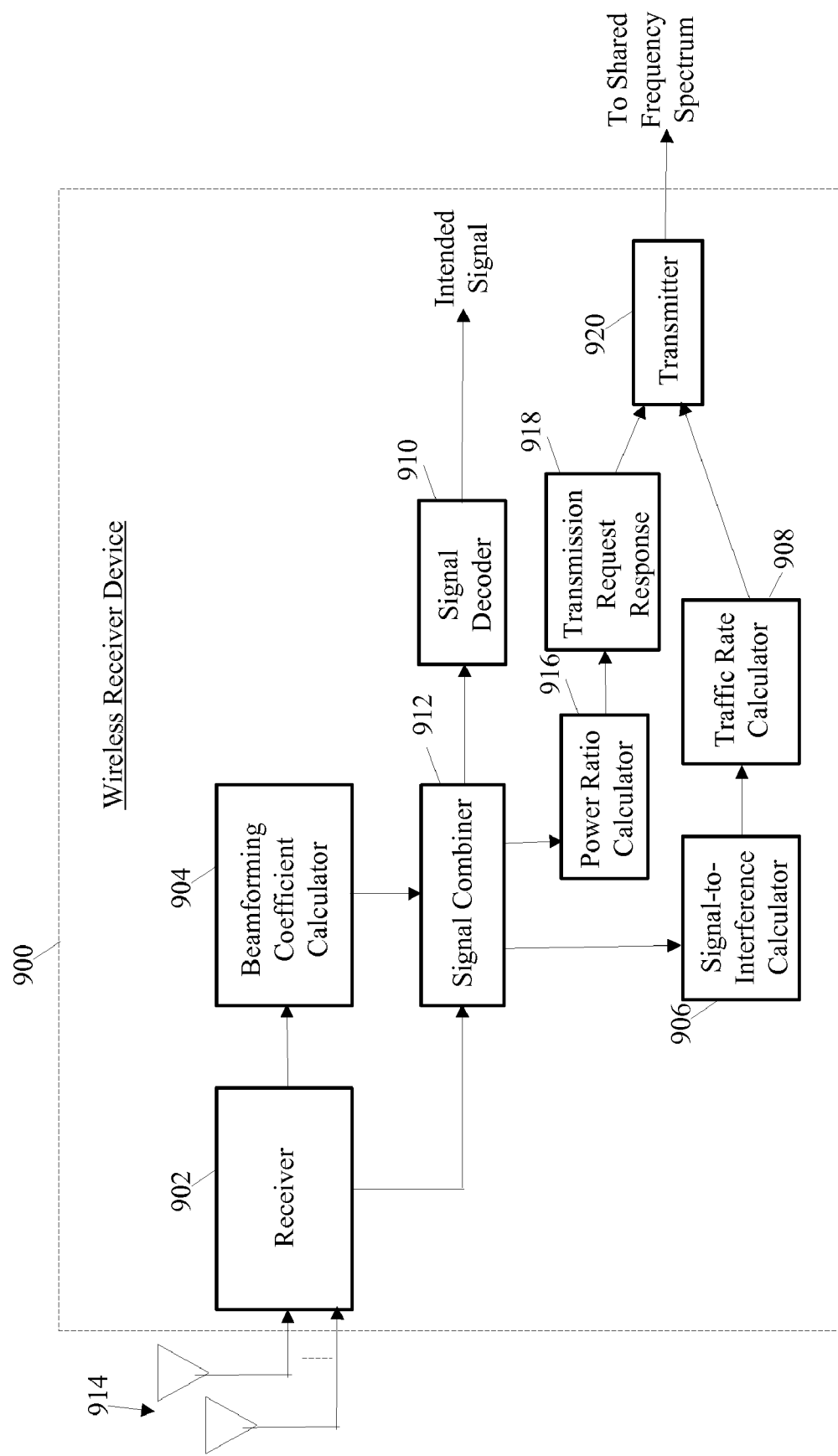
FIG. 9 is a block diagram of a wireless receiver device configured to utilize a plurality of receive antennas for beamforming and receiver yielding decisions.

FIG. 9 is a block diagram of a wireless receiver device configured to utilize a plurality of receive antennas for beamforming and receiver yielding decisions. The wireless receiver device 900 may include a receiver 902 coupled to a plurality of receive antennas 914. The receiver 902 may receive a first transmission request signal from a first device over the shared frequency spectrum, the first transmission request signal indicating that the first device intends to transmit a traffic signal to the wireless receiver device 900. The receiver 902 may monitor the shared frequency spectrum to receive a second transmission request signal, the second transmission request signal being transmitted by a third device and indicating that the third device intends to transmit a traffic signal to a fourth device.

The wireless receiver device 900 may determine whether to transmit a request response signal to the first device, the request response signal indicating that the second device is ready to receive a traffic signal from the first device, as a function of the received power of the first and second transmission request signals. In making such determination, a beamforming coefficient calculator 904 may determine a plurality of receive beamforming coefficients as a function of the received instances of the first and second transmission request signals in each of the plurality of receive antennas, each of the plurality of receive beamforming coefficients corresponding to one receive antenna 914. A signal combiner 912 may serve to combine the instances of the first transmission request signal received from the plurality of receive antennas using the determined plurality of receive beamforming coefficients. Similarly, the signal combiner 912 may combine the instances of the second transmission request signal received from the plurality of receive antennas using the determined plurality of receive beamforming coefficients.

A power ratio calculator 916 may be configured to calculate the ratio of the power of the combined first transmission request signal to the power of the combined second transmission request signal. A transmission request response module 918 determines whether to transmit a request response signal to the first device as a function of the power ratio. If the wireless device 900 determines to transmit a request response signal, the request response signal is transmitted to the first device via a transmitter 920.

The receiver 902 may also receive a first pilot signal from the first device over the shared frequency spectrum, the first pilot signal being received in each of the plurality of receive antennas. The beamforming coefficient calculator 904 may determine a plurality of receive beamforming coefficients as a function of the received first pilot signals in each of the plurality of receive antennas 914, each of the plurality of receive beamforming coefficients corresponding to one receive antenna. The signal-to-interference calculator 906 calculates a signal-to-interference ratio of the first pilot signal by combining the first pilot signal received from the plurality of receive antennas 914 using the determined plurality of receive beamforming coefficients. A traffic rate calculator 908 may generate a traffic rate report for the first device, the rate report including control information determined by the signal-to-interference ratio of the first pilot signal. The rate report is sent via the transmitter 920.

The receiver 902 may receive a traffic signal from the first device, the traffic signal being received in each of the plurality of receive antennas. The signal combiner 912 may combine the traffic signal received from the plurality of receive antennas 914 using the plurality of receive beamforming coefficients. A signal decoder 910 then decodes the combined traffic signal.

Figure 10:
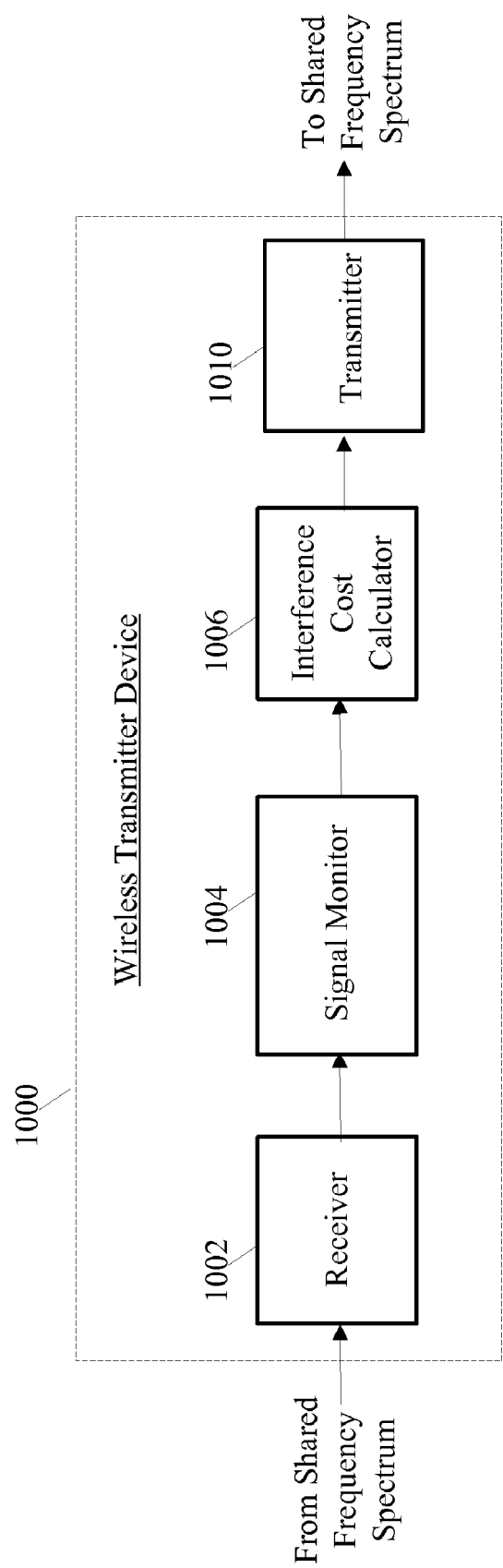
FIG. 10 is a block diagram of a wireless transmitter device configured to perform transmitter yielding within a peer-to-peer network according to feedback from a higher priority receiver device.

FIG. 10 is a block diagram of a wireless transmitter third device configured to perform transmitter yielding within a peer-to-peer network according to feedback from a higher priority receiver second device. The wireless transmitter third device 1000 may include a receiver 1002 for receiving a control message, the control message including control information indicating that a receiver second device of higher priority is capable of receive beamforming. The third device 1000 may use a transmitter 1010 to transmit a first transmission request signal to the fourth device, the first transmission request signal indicating that the third device intends to transmit a traffic signal to the fourth device. A signal monitor 1004 may be used to receive a first request response signal from the fourth device, the first request response signal indicating that the fourth device is ready to receive a traffic signal from the third device. The signal monitor 1004 may also receive a second request response signal from the second device, the second request response signal indicating that the second device is ready to receive a traffic signal from a first device. Interference cost calculator 1006 may calculate an interference cost to the second device, the interference cost being a function of the received power of the second request response signal. The third device 1000 may determine whether to transmit a traffic signal to the fourth device by comparing the calculated interference cost with a transmitter yielding threshold. If the calculated interference cost is below a transmitter yielding threshold the third device 1000 transmits a traffic signal. The control information also includes the number of receive antennas equipped at the second device. The value of the transmitter yielding threshold depends on the number of receive antennas of the second device. For instance, the value of the transmitter yielding threshold increases as the number of receive antennas of the second device increases.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

According to yet another configuration, one or more circuits may be in a mobile device may be adapted to perform the operations and/or functions described in FIGS. 1-10. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9 and/or 10 may be rearranged and/or combined into a single component, step, or function or embodied in several components, steps, or functions. Additional elements, components, steps, and/or functions may also be added. The apparatus, devices, and/or components illustrated in FIGS. 1, 2, 3, 8, 9, and/or 10 may be configured or adapted to perform one or more of the methods, features, or steps described in FIGS. 4, 5, 6 and/or 7. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a second device equipped with a plurality of receive antennas for facilitating a wireless peer-to-peer connection with a first device, comprising:
   receiving a first transmission request signal from the first device over a shared frequency spectrum, the first transmission request signal indicating that the first device intends to transmit a traffic signal to the second device;
   monitoring the shared frequency spectrum to receive a second transmission request signal, the second transmission request signal being transmitted by a third device and indicating that the third device intends to transmit a traffic signal to a fourth device;
   determining whether to transmit a request response signal to the first device, the request response signal indicating that the second device is ready to receive the traffic signal from the first device, as a function of a received power of the first and second transmission request signals;
   transmitting the request response signal to the first device if it is determined to transmit the request response signal;
   receiving a first pilot signal from the first device over the shared frequency spectrum, the first pilot signal being received in each of the plurality of receive antennas;
   determining a plurality of receive beamforming coefficients as a function of the received first pilot signals in each of the plurality of receive antennas, each of the plurality of receive beamforming coefficients corresponding to one receive antenna;
   calculating a signal-to-interference ratio of the first pilot signal by combining the first pilot signal received from the plurality of receive antennas using the determined plurality of receive beamforming coefficients; and
   sending a rate report signal to the first device, the rate report including control information determined by the signal-to-interference ratio of the first pilot signal.

2. The method of claim 1, further comprising:
   receiving the traffic signal from the first device, the traffic signal being received in each of the plurality of receive antennas;
   combining the traffic signal received from the plurality of receive antennas using the plurality of receive beamforming coefficients; and
   decoding the combined traffic signal.

3. The method of claim 1, wherein the plurality of receive beamforming coefficients are determined to maximize a signal power of the combined first pilot signal when the plurality of receive beamforming coefficients are used to combine the first pilot signal received from the plurality of receive antennas.

4. The method of claim 1, further comprising:
   receiving a second pilot signal from the third device, the second pilot signal being received in each of the plurality of receive antennas and representing interference to the second device; and
   wherein the plurality of receive beamforming coefficients are determined also as a function of the received second pilot signals in each of the plurality of receive antennas.

5. The method of claim 4, wherein the plurality of receive beamforming coefficients are determined to minimize an interference power of a combined second pilot signal when the plurality of receive beamforming coefficients are used to combine the second pilot signal received from the plurality of receive antennas.

6. The method of claim 4, wherein the plurality of receive beamforming coefficients are determined to maximize a ratio of a signal power to an interference power, the signal power being the power of the combined first pilot signal and the interference power being the power of a combined second pilot signal when the plurality of receive beamforming coefficients are used to combine respectively the first and second pilot signals received from the plurality of receive antennas.

7. The method of claim 1, wherein an instance of the first transmission request signal is received in each of the plurality of receive antennas and an instance of the second transmission request signal is received in each of the plurality of receive antennas, the method further comprising:
   determining a plurality of receive beamforming coefficients as a function of the received instances of the first and second transmission request signals in each of the plurality of receive antennas, each of the plurality of receive beamforming coefficients corresponding to one receive antenna;
   combining the instances of the first transmission request signal received from the plurality of receive antennas using the determined plurality of receive beamforming coefficients;
   combining the instances of the second transmission request signal received from the plurality of receive antennas using the determined plurality of receive beamforming coefficients; and
   calculating a ratio of a power of the combined first transmission request signal to a power of the combined second transmission request signal,
   wherein whether to transmit the request response signal to the first device is determined as a function of the power ratio.

8. The method of claim 1, further comprising:
   calculating a ratio of the received power of the first transmission request signal and the received power of the second transmission request signal,
   wherein it is determined to transmit the request response signal to the first device if the calculated power ratio is greater than or equal to a receiver yielding threshold.

9. The method of claim 8, wherein the value of the receiver yielding threshold depends on the number of the plurality of receive antennas, the value of the receiver yielding threshold decreasing as the number of receive antennas increases.

10. The method of claim 1, further comprising:
   sending a control message to the third device, the control message including control information indicating that the second device is capable of receive beamforming and the control information also including the number of the plurality of receive antennas equipped at the second device.

11. A second device configured to communicate with a first device within a wireless peer-to-peer communication network, comprising:
a transmitter and receiver for establishing a wireless peer-to-peer communication connection with the first device;
a plurality of receive antennas coupled to the receiver; and
a processing circuit coupled to the transmitter and receiver, the processing circuit configured to:
receive a first transmission request signal from the first device over a shared frequency spectrum, the first transmission request signal indicating that the first device intends to transmit a traffic signal to the second device;
monitor the shared frequency spectrum to receive a second transmission request signal, the second transmission request signal being transmitted by a third device and indicating that the third device intends to transmit a traffic signal to a fourth device;
determine whether to transmit a request response signal to the first device, the request response signal indicating that the second device is ready to receive the traffic signal from the first device, as a function of the received power of the first and second transmission request signals;
transmit the request response signal to the first device if it is determined to transmit the request response signal;
receive a first pilot signal from the first device over the shared frequency spectrum, the first pilot signal being received in each of the plurality of receive antennas;
determine a plurality of receive beamforming coefficients as a function of the received first pilot signals in each of the plurality of receive antennas, each of the plurality of receive beamforming coefficients corresponding to one receive antenna;
calculate a signal-to-interference ratio of the first pilot signal by combining the first pilot signal received from the plurality of receive antennas using the determined plurality of receive beamforming coefficients; and
send a rate report signal to the first device, the rate report including control information determined by the signal-to-interference ratio of the first pilot signal.

12. The second device of claim 11, wherein the processing circuit is further configured to:
receive the traffic signal from the first device, the traffic signal being received in each of the plurality of receive antennas;
combine the traffic signal received from the plurality of receive antennas using the plurality of receive beamforming coefficients; and
decode the combined traffic signal.

13. The second device of claim 11, wherein the plurality of receive beamforming coefficients are determined to maximize a signal power of the combined first pilot signal when the plurality of receive beamforming coefficients are used to combine the first pilot signal received from the plurality of receive antennas.

14. The second device of claim 11, wherein the processing circuit is further configured to:
receive a second pilot signal from the third device, the second pilot signal being received in each of the plurality of receive antennas and representing interference to the second device,
wherein the plurality of receive beamforming coefficients are determined also as a function of the received second pilot signals in each of the plurality of receive antennas.

15. The second device of claim 14, wherein the plurality of receive beamforming coefficients are determined to minimize an interference power of a combined second pilot signal when the plurality of receive beamforming coefficients are used to combine the second pilot signal received from the plurality of receive antennas.

16. The second device of claim 14, wherein the plurality of receive beamforming coefficients are determined to maximize a ratio of a signal power to an interference power, the signal power being the power of the combined first pilot signal and the interference power being the power of a combined second pilot signal when the plurality of receive beamforming coefficients are used to combine respectively the first and second pilot signals received from the plurality of receive antennas.

17. The second device of claim 11, wherein an instance of the first transmission request signal is received in each of the plurality of receive antennas and an instance of the second transmission request signal is received in each of the plurality of receive antennas, the processing circuit is further configured to:
determine a plurality of receive beamforming coefficients as a function of the received instances of the first and second transmission request signals in each of the plurality of receive antennas, each of the plurality of receive beamforming coefficients corresponding to one receive antenna;
combine the instances of the first transmission request signal received from the plurality of receive antennas using the determined plurality of receive beamforming coefficients;
combine the instances of the second transmission request signal received from the plurality of receive antennas using the determined plurality of receive beamforming coefficients; and
calculate a ratio of a power of the combined first transmission request signal to a power of the combined second transmission request signal,
wherein whether to transmit the request response signal to the first device is determined as a function of the power ratio.

18. The second device of claim 11, wherein the processing circuit is further configured to:
calculate a ratio of the received power of the first transmission request signal and the received power of the second transmission request signal,
wherein it is determined to transmit the request response signal to the first device if the calculated power ratio is greater than or equal to a receiver yielding threshold.

19. The second device of claim 18, wherein the value of the receiver yielding threshold depends on the number of the plurality of receive antennas, the value of the receiver yielding threshold decreasing as the number of receive antennas increases.

20. The second device of claim 11, wherein the processing circuit is further configured to:
send a control message to the third device, the control message including control information indicating that the second device is capable of receive beamforming and the control information also including the number of the plurality of receive antennas equipped at the second device.

21. A second device equipped with a plurality of receive antennas for facilitating a wireless peer-to-peer connection with a first device, comprising:
means for receiving a first transmission request signal from the first device over a shared frequency spectrum, the first transmission request signal indicating that the first device intends to transmit a traffic signal to the second device;

means for monitoring the shared frequency spectrum to receive a second transmission request signal, the second transmission request signal being transmitted by a third device and indicating that the third device intends to transmit a traffic signal to a fourth device;

means for determining whether to transmit a request response signal to the first device, the request response signal indicating that the second device is ready to receive the traffic signal from the first device, as a function of a received power of the first and second transmission request signals;

means for transmitting the request response signal to the first device if it is determined to transmit the request response signal;

means for receiving a first pilot signal from the first device over the shared frequency spectrum, the first pilot signal being received in each of the plurality of receive antennas;

means for determining a plurality of receive beamforming coefficients as a function of the received first pilot signals in each of the plurality of receive antennas, each of the plurality of receive beamforming coefficients corresponding to one receive antenna;

means for calculating a signal-to-interference ratio of the first pilot signal by combining the first pilot signal received from the plurality of receive antennas using the determined plurality of receive beamforming coefficients; and means for sending a rate report signal to the first device, the rate report including control information determined by the signal-to-interference ratio of the first pilot signal.

22. The second device of claim 21, further comprising:
means for receiving the traffic signal from the first device, the traffic signal being received in each of the plurality of receive antennas;
means for combining the traffic signal received from the plurality of receive antennas using the plurality of receive beamforming coefficients; and
means for decoding the combined traffic signal.

23. The second device of claim 21, wherein the plurality of receive beamforming coefficients are determined to maximize a signal power of the combined first pilot signal when the plurality of receive beamforming coefficients are used to combine the first pilot signal received from the plurality of receive antennas.

24. The second device of claim 21, wherein an instance of the first transmission request signal is received in each of the plurality of receive antennas and an instance of the second transmission request signal is received in each of the plurality of receive antennas, the second device further comprising:
means for determining a plurality of receive beamforming coefficients as a function of the received instances of the first and second transmission request signals in each of the plurality of receive antennas, each of the plurality of receive beamforming coefficients corresponding to one receive antenna;
means for combining the instances of the first transmission request signal received from the plurality of receive antennas using the determined plurality of receive beamforming coefficients;
means for combining the instances of the second transmission request signal received from the plurality of receive antennas using the determined plurality of receive beamforming coefficients;
means for calculating a ratio of a power of the combined first transmission request signal to a power of the combined second transmission request signal,
wherein whether to transmit the request response signal to the first device is determined as a function of the power ratio.

25. A circuit for interference mitigation in a peer-to-peer network, wherein the circuit operates in a second device having a plurality of receive antennas for facilitating a wireless peer-to-peer connection with a first device, wherein the circuit is adapted to:
receive a first transmission request signal from the first device over a shared frequency spectrum, the first transmission request signal indicating that the first device intends to transmit a traffic signal to the second device;
monitor the shared frequency spectrum to receive a second transmission request signal, the second transmission request signal being transmitted by a third device and indicating that the third device intends to transmit a traffic signal to a fourth device;
determine whether to transmit a request response signal to the first device, the request response signal indicating that the second device is ready to receive the traffic signal from the first device, as a function of the received power of the first and second transmission request signals;
transmit the request response signal to the first device if it is determined to transmit the request response signal;
receive a first pilot signal from the first device over the shared frequency spectrum, the first pilot signal being received in each of the plurality of receive antennas;
determine a plurality of receive beamforming coefficients as a function of the received first pilot signals in each of the plurality of receive antennas, each of the plurality of receive beamforming coefficients corresponding to one receive antenna;
calculate a signal-to-interference ratio of the first pilot signal by combining the first pilot signal received from the plurality of receive antennas using the determined plurality of receive beamforming coefficients; and
send a rate report signal to the first device, the rate report including control information determined by the signal-to-interference ratio of the first pilot signal.

26. A machine-readable medium comprising instructions for a second device equipped with a plurality of receive antennas to facilitate a wireless peer-to-peer connection with a first device, which when executed by a processor causes the processor to:
receive a first transmission request signal from the first device over a shared frequency spectrum, the first transmission request signal indicating that the first device intends to transmit a traffic signal to the second device;
monitor the shared frequency spectrum to receive a second transmission request signal, the second transmission request signal being transmitted by a third device and indicating that the third device intends to transmit a traffic signal to a fourth device;
determine whether to transmit a request response signal to the first device, the request response signal indicating that the second device is ready to receive the traffic signal from the first device, as a function of the received power of the first and second transmission request signals;
transmit the request response signal to the first device if it is determined to transmit the request response signal;

receive a first pilot signal from the first device over the shared frequency spectrum, the first pilot signal being received in each of the plurality of receive antennas;
determine a plurality of receive beamforming coefficients as a function of the received first pilot signals in each of the plurality of receive antennas, each of the plurality of receive beamforming coefficients corresponding to one receive antenna;
calculate a signal-to-interference ratio of the first pilot signal by combining the first pilot signal received from the plurality of receive antennas using the determined plurality of receive beamforming coefficients; and
send a rate report signal to the first device, the rate report including control information determined by the signal-to-interference ratio of the first pilot signal.

* * * * *